United States Patent Office 3,355,516
Patented Nov. 28, 1967

3,355,516
GRAFT POLYMERS OF VINYL CHLORIDE AND COMONOMER ONTO A PARTIALLY HYDROLYZED ETHYLENE-VINYL ESTER BACKBONE POLYMER
Dietrich Hardt, Bonn, Herbert Bartl, Cologne-Stammheim, and Rudolf Wust, Cologne-Muelheim, Germany, assignors to Farbenfabriken Bayer Aktiengesellschaft, Leverkusen, Germany, a German corporation
No Drawing. Filed Apr. 14, 1965, Ser. No. 447,987
Claims priority, application Germany, May 14, 1964, F 42,878
19 Claims. (Cl. 260—878)

This invention relates to special graft polymers of vinyl chloride on ethylene-vinylester copolymers and also to a process for the production of such types of polymer. If vinyl chloride is polymerized in the presence of partially saponified ethylene-vinylester copolymers, more especially ethylene-vinylacetate, then homogeneous, compatible products with a varying degree of hardness, depending on the quantity of copolymer used, are obtained. These products have interesting properties. In particular the capacity to cross-link by way of the free hydroxyl groups, for example with polyisocyanates is of interest. Nevertheless, the limited solubility in the solvents which are normally employed industrially precludes a wider use of these graft polymers, particularly as a lacquer or coating medium, since these polymers containing high proportions of polyvinyl chloride are only soluble in tetrahydrofuran, dioxan or cyclohexanone in appreciable concentration. In addition, the bonding strength, particularly with metals, is not in accordance with the standards required for a lacquer or coating medium. Graft copolymers of vinyl chloride on unsaponified ethylene-vinylacetate copolymers have also inadequate bonding strengths on substrates such as metal or glass. We now have found that partially saponified ethylene-vinylester copolymers, more especially partially saponified copolymers of ethylene and vinyl acetate, can be subjected to graft polymerization with vinyl chloride and $\alpha,\beta$-monoolefinically unsaturated monocarboxylic or dicarboxylic acids or their derivatives and/or vinyl esters to obtain graft polymers containing free hydroxyl groups. The ethylene-vinylacetate copolymer (A) with a vinylacetate content of from 40 to 75% by weight, in which the acetyl groups have been removed by hydrolysis from 10 to 60%, have grafted thereon a monomer mixture (B) of from 60 to 95% by weight of vinyl chloride and 5 to 40% by weight of an $\alpha,\beta$-unsaturated monocarboxylic or dicarboxylic acid or their derivatives and/or of a vinylester. Polymerization is accomplished by using conventional polymerization initiators. From 95 to 30% by weight of monomer mixture containing vinyl chloride is used to from 5 to 70% by weight of the partially saponified ethylene-vinylacetate copolymer.

Suitable monoolefinically unsaturated monocarboxylic or dicarboxylic acids for the preparation of the present graft polymers are acids having 3 to 4 carbon atoms, such as acrylic acid, methacrylic acid, fumaric acid, maleic acid. Suitable derivatives of these acids are esters thereof with aliphatic or cycloaliphatic alcohols, especially monohydric or dihydric alcohols having 1–20 carbon atoms, such as methanol, ethanol, propanol, butanol, hexanol, glycolhexanol, decanol, dodecanol, octadecanol, ethylene glycol, diethylene glycol, propylene glycol, butylene glycol, pentane-diol, hexane diol. The preferred esters are the monoesters of the aforementioned acids and alcohols, such as monoesters of acrylic and methacrylic acid with mono- or dihydric saturated aliphatic alcohols having 1–18 and preferably 1–6 carbon atoms, and the monoesters of maleic acid with monohydric saturated aliphatic (including cycloaliphatic) alcohols having 1–20 carbon atoms.

Specific examples of these esters are methylacrylate, ethylacrylate, butylacrylate, methylmethacrylate, ethylmethacrylate, butylmethacrylate, oxyethylmethacrylate, oxypropylmethacrylate, oxybutylmethacrylate, oxyhexylmethacrylate, semiesters of maleic acid and methanol, ethanol, propanol, butanol, hexanol, decanol, dodecanol, octadecanol. Furthermore there may be used the diesters of maleic or fumaric acid with the above monohydric saturated aliphatic alcohols such as methanol, ethanol, propanol, butanol, hexanol.

Suitable ethylene vinylacetate copolymers are those which have been obtained by polymerization in a homogeneous liquid phase containing predominantly tertiary butanol. The ethylene vinylacetate copolymers are saponified by known methods.

Suitable vinyl esters are those vinyl esters which contain 1 to 6 carbon atoms in the ester grouping, for example, vinyl acetate, vinyl propionate, vinyl butyrate, vinyl benzoate and oxalic acid monovinyl ester.

The polymers of the present process are obtained by polymerizing vinyl chloride, in admixture with one or more monomers of the classes mentioned above, in the presence of partially saponified ethylene-vinylester copolymers, for example in solution or in aqueous dispersion. In a preferred embodiment, the partially saponified ethylene-vinylacetate copolymer is dissolved together with a polymerization inhibitor in the monomer mixture, this solution is dispersed while stirring vigorously in water and polymerized with increase of temperature. It is not absolutely necessary in such cases to initially prepare separately the solution of the partially saponified copolymer in the monomer mixture. All the reactants can be introduced into an autoclave and, in this case, while stirring at room temperatures, the copolymer simultaneously dissolves in the vinyl chloride and this solution disperses in water. Polymerization then takes place by raising the temperature.

To initiate the polymerization, conventional radical formers are used such as organic peroxy compounds, lauroyl peroxide, benzoyl peroxide, etc. or readily decomposable azo compounds such as $\alpha,\alpha'$-azodiisobutyronitrile. They are used in quantities of from 0.05 to 1%.

The polymerisation temperatures are from 20 to 80° C. By the addition of regulators, more especially halogenated aliphatic hydrocarbons such as chloroform, carbon tetrachloride or trichlorethylene, it is possible to influence the molecular weight of the products. Methyl cellulose, gelatine or polyvinyl alcohol, for example are used as dispersing agent.

Using the process, finely dispersed or powdered bead polymers are obtained, which are soluble in ketones, for example acetone, methylethyl ketone, cyclohexanone or the mixtures thereof. The ketones can be used as solvents in admixture with esters, for example, butylacetate, ethylacetate, halogenated hydrocarbons or aromatic hydrocarbons.

The solutions of the graft copolymers can be applied by brushing, dipping, spraying, scattering or casting on to the substrates and, on vaporisation of the solvent at room temperature or under heat, leave behind dry, firm, elastic, transparent films with extraordinary bonding strength on metal, glass, paper, textiles and a large number of other substrates. They can be used as lacquers, adhesion promoters, adhesives and coatings and are compatible with conventional fillers and pigments. A combination with wash primers is possible in every case. The products are resistant to numerous solvents. For example, films of this type are completely resistant to water and cannot be softened in water. The stability of these lacquers or coatings can however be considerably improved if the products are cross-linked by way of the free hydroxyl groups of the grafting substrate and/or by way of functional groups of a monomer optionally incorporated by polymerisation. Hydroxyl and carboxyl groups, which can be cross-linked with polyisocyanates or N-methylol melamine ethers, can be used separately or in combination. Polymers containing carboxyl groups can also be cross-linked with diisonitriles with addition of carbonyl compounds. By cross-linking, which occurs at room temperature with polyisocyanates, the films become extremely resistant to solvents and chemicals. They retain their outstanding mechanical properties, i.e. high strength with simultaneous elasticity and the bonding strength with the support is sometimes even improved.

EXAMPLE 1

A stirrer-type autoclave is filled with 6000 parts of water, in which are dissolved 40 parts of methyl cellulose, 600 parts of an ethylene-vinylacetate copolymer with an original vinyl acetate content of 66% by weight, but saponified to an OH-content of 6% by weight and a mixture of 2400 parts of vinyl chloride, 100 parts of maleic acid propyl semiester, 50 parts of maleic acid dodecyl semiester, 5 parts of azodiisobutyronitrile and 100 parts of trichlorethylene. The mixture is stirred vigorously for 5 hours at 20° C. and polymerised for 15 hours at 62° C. After washing and drying, 2276 parts of a finely dispersed bead polymer are obtained, which is completely soluble in methylethyl-ketone. On vaporisation of the solvent, a hard, elastic film of high strength is left which bonds securely to metal and glass. The product contains 1.4% of OH and 40.0% of chlorine.

For cross-linking, a solution of the polymer in methylethyl ketone of 3% by weight, based on solid substance, of a reaction product of 1 mol of trimethylol propane and 3 mols of toluylene diisocyanate as the cross-linking agent is added. After a film cast from this solution has stood for 5 hours at room temperature, complete cross-linking has taken place. If a film containing the above cross-linking component is heated immediately after casting for 15 minutes at 120° C., a product is obtained which is even superior in its bonding strength and its resistance to solvents to the material cross-linked in the cold. The cross-linking can also be carried out with 3% of hexamethylol melamine hexabutyl ether at 120° C.

EXAMPLE 2

An autoclave is charged with 600 parts of an ethylene-vinylacetate copolymer, which originally contained 65% of vinylacetate but which had been saponified to an HO-content of 4.8%, 2200 parts of vinylchloride, 200 parts of vinylacetate, 200 parts of maleic acid propyl semiester, 6000 parts of water, 40 parts of methyl cellulose and 5 parts of azodiisobutyronitrile. The mixture is stirred vigorously for 5 hours at room temperature and thereafter is polymerised for 15 hours at 62° C. After washing and drying, 2551 parts of a finely dispersed polymer, which contains 60% of polyvinyl chloride, 6.9% of maleic acid propyl semiester and 1.1% of OH, are obtained. The K-value is 54.

Solutions of the polymer in methylethyl ketone leave a firm, clear film. The product can be cross-linked by conventional methods with polyisocyanates or methylol melamine ethers, has excellent bonding power with glass and metals and is insoluble in organic solvents.

If such films cast on to glass or metals are stored for several days in water, no change of any kind occurs. The bonding strength is maintained.

EXAMPLE 3

In an autoclave, 600 parts of a copolymer of ethylene and vinylacetate with originally 65% of vinylacetate, which had been saponified to an OH-content of 5.8% by weight, 2200 parts of vinyl chloride, 100 parts of vinylacetate, 100 parts of oxypropylmethacrylate, 100 parts of maleic acid dodecyl semiester, 6000 parts of water, 40 parts of methyl cellulose and 5 parts of azodiisobutyronitrile are stirred for 5 hours at 20° C. The mixture is then polymerised for 15 hours at 62° C. while stirring vigorously. 2265 parts of a finely dispersed polymer are obtained, which contains 68% of polyvinyl chloride and 1.5% of OH. The K-value is 58. The product is soluble in methylethyl ketone.

*Cross-linking.*—A solution of the polymer in methylethyl ketone cyclohexanone (1:1) is mixed with 5% based on solid substance, of a reaction product of 1 mol of trimethylol propane and 3 mols of toluylene diisocyanate, and cast to form a film. After drying for 5 hours at room temperature, an elastic, hard, firm film with good bonding strength to metal and glass is obtained. The product is cross-linked and is insoluble in organic solvents, and merely softens to a slight degree, for example, with ethyl acetate. If such a film, after quick drying in air for 15 minutes at 120° C. or 180° C., is heated, the bonding strength and resistance to solvents are further improved.

*Cross-linking with a melamine derivative.*—A solution of the product in a mixture of methylethylketone and cyclohexanone (1:1) is stirred with 5%, based on solid content, of N-hexamethylol melamine hexabutyl ether cast to form a film, initially dried for 30 minutes in air and further heated for 15 minutes at 120° C. The result is a completely cross-linked, insoluble, firm, clear film.

What we claim is:

1. A graft copolymer of a mixture of (a) vinyl chloride and (b) monoethylenically unsaturated monomers containing within the molecule a member selected from the group consisting of carboxylic acid and esterified carboxylic acid groups said mixture being grafted upon a backbone of a copolymer of ethylene and a vinyl ester of an organic carboxylic acid, said backbone copolymer having been partially hydrolyzed to remove from 10 to 60% of the ester groups.

2. A graft copolymer of (a) a backbone ethylene-vinylacetate copolymer having a vinyl acetate content of from 40 to 75% by weight, in which from 10 to 60% of the acetyl groups have been removed by hydrolysis, and grafted thereon (b) a mixture of monomers consisting of from 60 to 95% by weight of vinyl chloride and 5 to 40% by weight of a monomer selected from the group consisting of (i) $\alpha, \beta$-monoolefinically unsaturated mono- and di-carboxylic acids having 3 to 4 carbon atoms, (ii) esters of $\alpha, \beta$-monoolefinically unsaturated mono- and dicarboxylic acids having 3 to 4 carbon atoms with mono- and dihydric saturated aliphatic alcohols having 1 to 20 carbon atoms, (iii) organic vinyl esters of mono- and dicarboxylic acids having 1 to 6 carbon atoms and (iv) mixtures thereof, said graft copolymer containing from 5 to 70% by weight of component (a) and 95 to 30% by weight of component (b).

3. A graft copolymer of (a) a backbone ethylene vinylacetate copolymer having a vinyl acetate content of from 40 to 75% by weight, in which from 10 to 60% of the acetyl groups have been removed by hydrolysis, and grafted thereon (b) a mixture of monomers consisting of from 60 to 95% by weight of vinyl chloride and 5 to 40% by weight of a monomer selected from the group consisting of (i) an ester of an $\alpha, \beta$-monoolefinically unsaturated monocarboxylic acid having 3 to 4 carbon atoms with a monohydric saturated aliphatic alcohol having 1 to 6 carbon atoms, (ii) an ester of said monocarboxylic acid with a dihydric saturated aliphatic alcohol having 2 to 6 carbon atoms, (iii) a diester of an $\alpha, \beta$-monoolefinically unsaturated dicarboxylic acid having 3 to 4 carbon atoms with a monohydric saturated aliphatic alcohol having 1 to 6 carbon atoms, (iv) a semiester of said dicarboxylic acid with a monohydric saturated alcohol having 1–20 carbon atoms, (v) an organic vinylester of a mono- or dicarboxylic acid having 1 to 6 carbon atoms and (vi) mixtures thereof, said graft copolymer containing 5 to 70% by weight of component (a) and 95 to 30% by weight of component (b).

4. A graft copolymer according to claim 3, wherein monomer (i) of component (b) is a member of the group consisting of methylacrylate, methylmethacrylate, and butylmethacrylate.

5. A graft copolymer according to claim 3, wherein monomer (ii) of component (b) is oxyethylpropylmethacrylate.

6. A graft copolymer according to claim 3, wherein monomer (iii) of component (b) is a member of the group consisting of maleic acid diethylester and fumaric acid diethylester.

7. A graft copolymer according to claim 3, wherein monomer (iv) of component (b) is a semiester of maleic acid with an alcohol of the group consisting of propanol, dodecanol and mixtures thereof.

8. A graft copolymer according to claim 3, wherein monomer (v) of component (b) is vinyl acetate.

9. A cross-linked reaction product of the graft copolymer of claim 1, with a cross-linking agent containing at least two groups capable of reacting with a member of the group consisting of the hydroxyl groups and carboxylic groups of said graft copolymer to form cross-linked reaction products.

10. A cross-linked reaction product of the graft copolymer of claim 3 with a cross-linking agent containing at least groups capable of reacting with the hydroxyl groups of said graft copolymer to form cross-linked reaction products.

11. A cross-linked reaction product according to claim 9, wherein said cross-linked agent is selected from the group consisting of organic compounds containing at least two methylol groups, organic compounds containing at least two etherified methylol groups and organic compounds containing at least two isocyanate groups.

12. A process for the production of graft copolymers comprising grafting onto (a) a backbone ethylene vinyl acetate copolymer having a vinyl acetate content of from 40 to 75% by weight, in which from 10 to 60% of the acetyl groups have been removed by hydrolysis, (b) a mixture of monomers consisting of from 60 to 95% by weight of vinyl chloride and 5 to 40% by weight of a monomer selected from the group consisting of (i) $\alpha$, $\beta$-monoolefinically unsaturated mono- and dicarboxylic acids having 3 to 4 carbon atoms, (ii) esters of $\alpha$, $\beta$-monoolefinically unsaturated mono- and dicarboxylic acids having 3 to 4 carbon atoms with mono- and dihydric saturated aliphatic alcohols having 1 to 20 carbon atoms, (iii) organic vinylesters of mono- and dicarboxylic acids having 1 to 6 carbon atoms and (iv) mixtures thereof by reacting (a) and (b) in effective contact with a radical polymerization catalyst at a temperature between 20 and 80° C., the graft copolymer produced containing 5 to 70% by weight of component (a) and 95 to 30% by weight of component (b).

13. A process for the production of graft copolymers comprising grafting onto (a) a backbone ethylene vinyl acetate copolymer having a vinyl acetate content of from 40 to 75% by weight, in which from 10 to 60% of the acetyl groups have been removed by hydrolysis, (b) a mixture of monomers consisting of from 60 to 95% by weight of vinyl chloride and 5 to 40% by weight of a monomer selected from the group consisting of (i) an ester of an $\alpha$, $\beta$-monoolefinically unsaturated monocarboxylic acid having 3 to 4 carbon atoms with a monohydric saturated aliphatic alcohol having 1 to 6 carbon atoms, (ii) an ester of said monocarboxylic acid with a dihydric saturated aliphatic alcohol having 2 to 6 carbon atoms, (iii) diester of an $\alpha$, $\beta$-monoolefinically unsaturated dicarboxylic acid having 3 to 4 carbon atoms with a monohydric saturated aliphatic alcohol having 1 to 6 carbon atoms, (iv) a semiester of said dicarboxylic acid with a monohydric saturated alcohol having 1–20 carbon atoms, (v) an organic vinylester of a mono- or dicarboxylic acid having 1 to 6 carbon atoms and (vi) mixtures thereof by reacting (a) and (b) in effective contact with a radical polymerization catalyst at a temperature between 20 and 80° C. the graft copolymer produced containing 5 to 70% by weight of component (a) and 95 to 30% by weight of component (b).

14. A process according to claim 13, wherein monomer (i) of component (b) is a member of the group consisting of methylacrylate, methylmethacrylate and butylmethacrylate.

15. A process according to claim 13, wherein monomer (ii) of component (b) is oxyethylpropylmethacrylate.

16. A process according to claim 13, wherein monomer (iii) of component (b) is a member of the group consisting of maleic acid diethylester and fumaric acid diethylester.

17. A process according to claim 13, wherein monomer (iv) of component (b) is a semiester of maleic acid with an alcohol of the group consisting of propanol, dodecanol and mixtures thereof.

18. A process according to claim 13, wherein monomer (v) of component (b) is vinyl acetate.

19. A process according to claim 13, wherein said radical catalyst is $\alpha,\alpha'$-azodiisobutyronitrile.

No references cited.

SAMUEL H. BLECH, *Examiner.*

D. J. BREZNER, *Assistant Examiner.*